United States Patent [19]
Maag et al.

[11] Patent Number: 5,210,399
[45] Date of Patent: May 11, 1993

[54] OPTICAL PROBE HEAD WITH MOUNTING MEANS PROVIDING A FREE RECALIBRATION OF THE SENSING HEAD AFTER A COLLISION

[75] Inventors: Robert Maag, Herrieden; Lothar Rübl, Aalen, both of Fed. Rep. of Germany

[73] Assignee: Carl-Zeiss-Stiftung, Heidenheim, Fed. Rep. of Germany

[21] Appl. No.: 863,773

[22] Filed: Apr. 6, 1992

[30] Foreign Application Priority Data

Oct. 18, 1991 [DE] Fed. Rep. of Germany ....... 4134482

[51] Int. Cl.$^5$ .............................................. G05B 1/00
[52] U.S. Cl. .................. 250/202; 250/227.24
[58] Field of Search ............. 250/202, 227.11, 227.24, 250/227.26, 227.20, 561; 385/50; 318/577

[56] References Cited
U.S. PATENT DOCUMENTS

| | | | |
|---|---|---|---|
| 3,704,373 | 11/1972 | Bardwell et al. | 250/202 |
| 4,270,275 | 6/1981 | McMurtry | 33/561 |
| 4,963,728 | 10/1990 | Hof et al. | 280/227.11 |
| 5,134,280 | 7/1992 | Johnston et al. | 250/227.11 |

Primary Examiner—David C. Nelms
Assistant Examiner—Que T. Le
Attorney, Agent, or Firm—Walter Ottesen

[57] ABSTRACT

An optical probe head has a front optic and an annular enclosure surrounding the front optic. The enclosure contains the illuminating device of the probe head. The front optic is rigidly attached to the optical probe head and the enclosure having the illuminating device and surrounding the front optic is attached to the optical probe head so as to be radially yieldable. In the case of a collision, only the enclosure having the illuminating optics is therefore deflected; whereas, the imaging optics remains undisturbed. In this way, a follow-up calibration of the probe head after a collision is no longer required.

9 Claims, 2 Drawing Sheets

OPTICAL PROBE HEAD WITH MOUNTING MEANS PROVIDING A FREE RECALIBRATION OF THE SENSING HEAD AFTER A COLLISION

FILED OF THE INVENTION

The invention relates to an optical probe head for coordinate measuring apparatus having a front optic and a part surrounding the front optic which contains the illuminating device of the probe head or parts thereof.

BACKGROUND OF THE INVENTION

A probe head of this kind is, for example, disclosed in U.S. Pat. No. 4,963,728. The probe head described there has also a collision protective device. This collision protective device comprises a yieldable kink joint in the measuring arm of the coordinate measuring apparatus by means of which the entire probe head is suspended, that is, when a collision of the probe head with the workpiece takes place, the entire probe head is deflected out of its calibrated zero position including the imaging optics having a beam path which is tilted thereby. When the collision situation is removed, the probe head again returns to the zero position fixed by the yieldable kink joint but not with complete precision. Accordingly, and if a highly precise measuring value is wanted, the alignment of the optical probe head must be newly calibrated after a collision. This means a time delay during which the machine is not available for measuring tasks.

SUMMARY OF THE INVENTION

It is an object of the invention to improve the collision protective device of a probe head of the above-mentioned type so that, after collision situations, further work can be performed without a renewed calibration and without a deterioration of accuracy.

This object is achieved with the optical probe head according to the invention.

The optical probe head of the invention is for a coordinate measuring apparatus for measuring an object. The optical probe head includes a first holder attachable to a measuring arm of the coordinate measuring apparatus. The probe head further includes a front optic for transmitting an image of the object; the front optic being fixedly mounted on the first holder and defining an optical axis; a second holder surrounding the front optic; an illuminating device for illuminating the object; the illuminating device being mounted on the second holder; and, mounting means for mounting the second holder on the first holder so as to permit the second holder and the illuminating device mounted thereon to move relative to the first holder and the front optic in response to an impact load applied to the second holder whereby the front optic is not mechanically stressed by the impact load.

According to a feature of the invention, the front optic is fixedly attached to the optical probe head and the second holder having the illuminating device and surrounding the front optic is attached to the optical probe head so as to be radially yieldable.

With these measures, the imaging beam path determining the measurement accuracy is completely separated from the collision protective device. Accordingly, measurement errors after a collision are precluded because the front optic and therefore the imaging beam path remain fixedly connected to the optical probe head of the coordinate measuring apparatus, that is, the front optic retains undisturbed its spatial position with reference to the coordinate measuring system of the coordinate measuring apparatus and only the illuminating device of the probe head is deflected in the case of a collision. The illuminating device is non-critical with respect to measurement accuracy. In this context, it is especially purposeful when the second holder surrounding the front optic and having the illuminating device is configured as an annular sleeve which surrounds the fixed part of the probe head having the imaging optics. In this way, the probe head is reliably protected in all directions when a collision takes place.

The annular sleeve furthermore projects in the direction of the optical axis beyond the imaging optics. For this reason, adequate protection also in the probe direction is guaranteed.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
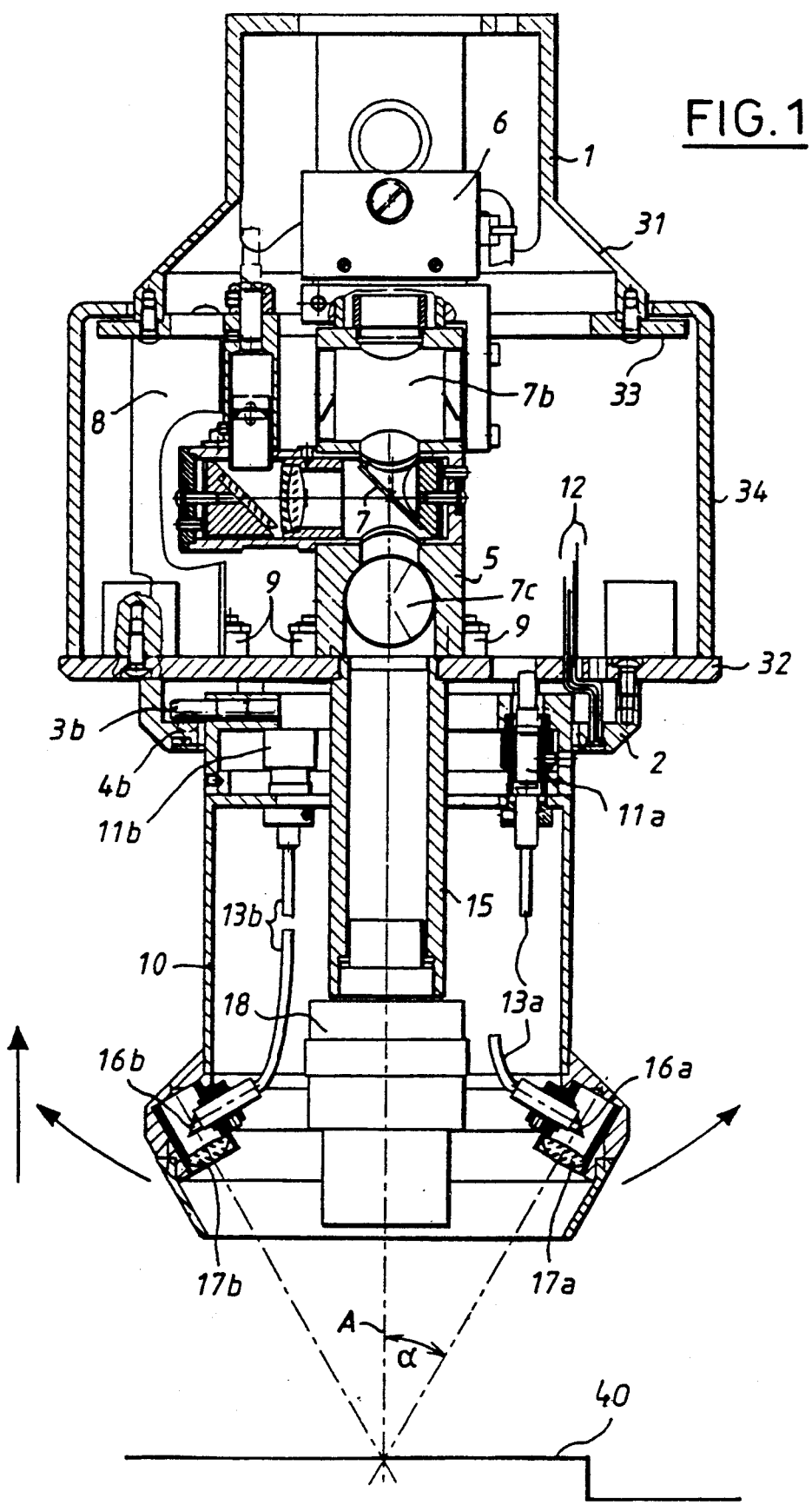
FIG. 1 is a side elevation view, in section, of the optical probe head of the invention.

In FIG. 1, reference numeral 1 identifies the part of the probe head which is seated on the measuring arm of the coordinate measuring apparatus with the measuring arm having a rectangular cross section. The part 1 therefore likewise has a rectangular cross section which opens into a conical shoulder 31 having a greater diameter. An upper annular holding plate 33 is screwed to the lower side of the shoulder 31.

A lower holding plate 32 is fixedly connected to the upper holding plate 33 by means of struts 8. The lower holding plate 32 carries the imaging optics of the optical probe head. The tubular piece 5 is supported by the plate 32 and the mount of a beam splitter 7 is, for example, seated on the tubular piece 5 and the axial incident bright-field illumination is axially coupled in via the beam splitter 7. Furthermore, mounts (7b, 7c) are provided in the tubular piece 5 wherein beam splitters can likewise be seated in order to reflect an active laser measurement system and further illuminating techniques for supporting the video auto-focus into the optical imaging beam path.

A tube 15 is seated in the plate 32 which holds the front optic 18 of the probe head at its lower end by means of a threaded mount.

The front optic 18 is an exchangeable objective through which the object surface is imaged on the video camera.

Reference numeral 34 identifies a covering hood which protects the interior of the probe head and its optics against the penetration of dust and dirt.

Figure 2:
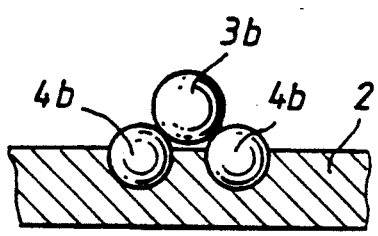
FIG. 2 is a section view taken through one of the bearing units of the optical probe head; and, FIG. 3 is a schematic showing how springs resiliently bias the annular enclosure containing the illuminating device into its bearing seat during dynamic movements of the optical probe head.

An annular shoulder 2 which projects downwardly and inwardly is attached to the lower side of the lower holding plate 32 with the annular shoulder 2 being concentric to the tube 15. Three bearing pairs are seated on the shoulder 2 at a radial angular spacing of 120°. The bearing 4b of one of the three bearing pairs is shown schematically in FIG. 2. The bearings 4b are cemented in the annular shoulder 2 so as to be insulated and are electrically connected to each other so that the bearings of each pair define respective contacts of an electrical switch. The three switches formed in this manner are connected in series, that is, they are connected one behind the other as disclosed, for example, in U.S. Pat. No. 4,270,275 incorporated herein by reference. The supply cables to the series circuit are identified by reference numeral 12.

An annular enclosure 10 surrounding the front optic 18 lies on the three bearing pairs by means of three radial insulated cylinder bodies projecting outwardly of which the cylinder body 3b is shown in the drawing. The annular enclosure 10 widens at its lower end. There, four projecting optics of which two (17a, 17b) are shown are seated in the annular enclosure at an angle to the optical axis A of the front optic 18 in such a manner that this angle $\alpha$ is adequate for a dark-field illumination of the object 40 or of the object surface. The four projecting optics are supplied via respective light conductors of which two (13a, 13b) are shown. These light conductors have ends which are introduced into the mounts of the projecting optics at an angle of 90° as shown for projecting optics (17a, 17b). Four reflecting prisms of which two (16a, 16b) are shown are seated at the ends of the light conductors and reflect the illuminating light supplied by the light conductors into the optical axes of the respective optics (of which 17a and 17b are shown).

The annular enclosure 10 holding the illuminating optics described above lies with its own weight and by means of six springs 9, which are symmetrically arranged to the bearings, with a defined pressure force via the cylinder bodies 3b on the three bearing pairs 4b and can yield when there is a collision, for example with a workpiece, with one of the cylinder bodies 3b being lifted from the three point bearing defined in this manner.

In this way, at least one of the switch contacts of the series circuit described above opens.

Figure 3:
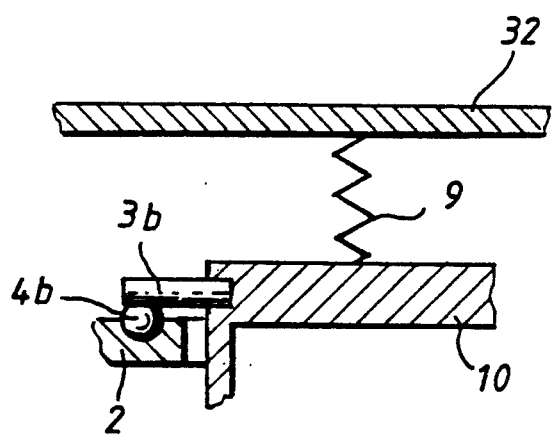

The springs 9 hold the annular enclosure 10 in the bearings during dynamic movements for preventing defective announcements and bias the annular enclosure 10 back into its rest position after a collision. The springs 9 are interposed between the annular enclosure 10 and the holding plate 32 as shown schematically in FIG. 3 and resiliently bias the enclosure into its rest position against bearings 4b. Adequate clearance is provided between the annular enclosure 10 and the shoulder 2 as well as the tube 15 to permit the enclosure 10 to deflect independently of the optics 18 when there is a collision.

The supply cables 12 to the series circuit are connected to the collision protective circuit of the coordinate measuring apparatus and this collision protective circuit ensures that the coordinate measuring apparatus is braked when the annular enclosure 10 is deflected, that is, when one of the three contacts in the three point bearings of the enclosure 10 opens. This braking takes place adequately fast and the free stroke for the deflecting movement of the annular enclosure 10 is so adequately large dimensioned that the parts of the illuminating optics in the annular enclosure 10 of the probe head do not touch the front optic 18 or the tubular pipe 15 when there is a collision. The components necessary for imaging of the object on the video camera are therefore not mechanically stressed. The imaging conditions remain undisturbed also in the case of a collision and therefore a calibration of the optical probe head after a collision is no longer required.

It is understood that the foregoing description is that of the preferred embodiments of the invention and that various changes and modifications may be made thereto without departing from the spirit and scope of the invention as defined in the appended claims.

What is claimed is:

1. An optical probe head for coordinate measuring apparatus for measuring an object, the apparatus having a measuring arm and the optical probe head comprising:
   a first holder attachable to said measuring arm;
   a front optic for transmitting an image of the object;
   said front optic being fixedly mounted on said first holder and defining an optical axis;
   a second holder surrounding said front optic;
   an illuminating device for illuminating the object;
   said illuminating device being mounted on said second holder; and,
   mounting means for mounting said second holder on said first holder so as to permit said second holder and said illuminating device mounted thereon to move relative to said first holder and said front optic in response to an impact load applied to said second holder whereby said front optic is not mechanically stressed by said impact load.

2. The optical probe head of claim 1, said mounting means including collision protective circuit means for supplying an electrical signal in response to said movement of said second holder.

3. The optical probe head of claim 1, said second holder being an annular sleeve-like member.

4. The optical probe head of claim 3, said annular sleeve-like member extending in the direction of said axis outwardly beyond said front optic.

5. The optical probe head of claim 1, further comprising a tube rigidly connected to said first holder and extending downwardly along said axis within said second holder; and, said front optic being exchangeably mounted on said tube.

6. The optical probe head of claim 1, further comprising light conductor means for supplying light to said illuminating device.

7. The optical probe head of claim 1, further comprising a video camera mounted on said first holder for receiving the image transmitted by said front optic; said illuminating device being mounted on said second holder so as to radiate light at an angle ($\alpha$) to said optical axis; and, said angle ($\alpha$) being selected to provide a dark-field illumination of the object.

8. An optical probe head for coordinate measuring apparatus for measuring an object, the apparatus having a measuring arm and the optical probe head comprising:
   a holder attachable to said measuring arm;
   a front optic for transmitting an image of the object;
   said front optic being fixedly mounted on said holder and defining an optical axis;
   an annular sleeve-like member surrounding said front optic;
   an illuminating device for illuminating the object;
   mounting means for mounting said annular sleeve-like member on said holder so as to permit said annular sleeve-like member to move relative to said holder in response to an impact load applied to said annular sleeve-like member whereby said front optic is not mechanically stressed by said impact load; and, said mounting means including collision protective circuit means for supplying an electrical signal in response to said movement of said annular sleeve-like member.

9. The optical probe head of claim 8, said illuminating device being mounted on said annular sleeve-like member.

* * * * *